Jan. 9, 1968  P. L. DE LUCA  3,362,291
FAIRING
Filed Sept. 3, 1965  3 Sheets-Sheet 1
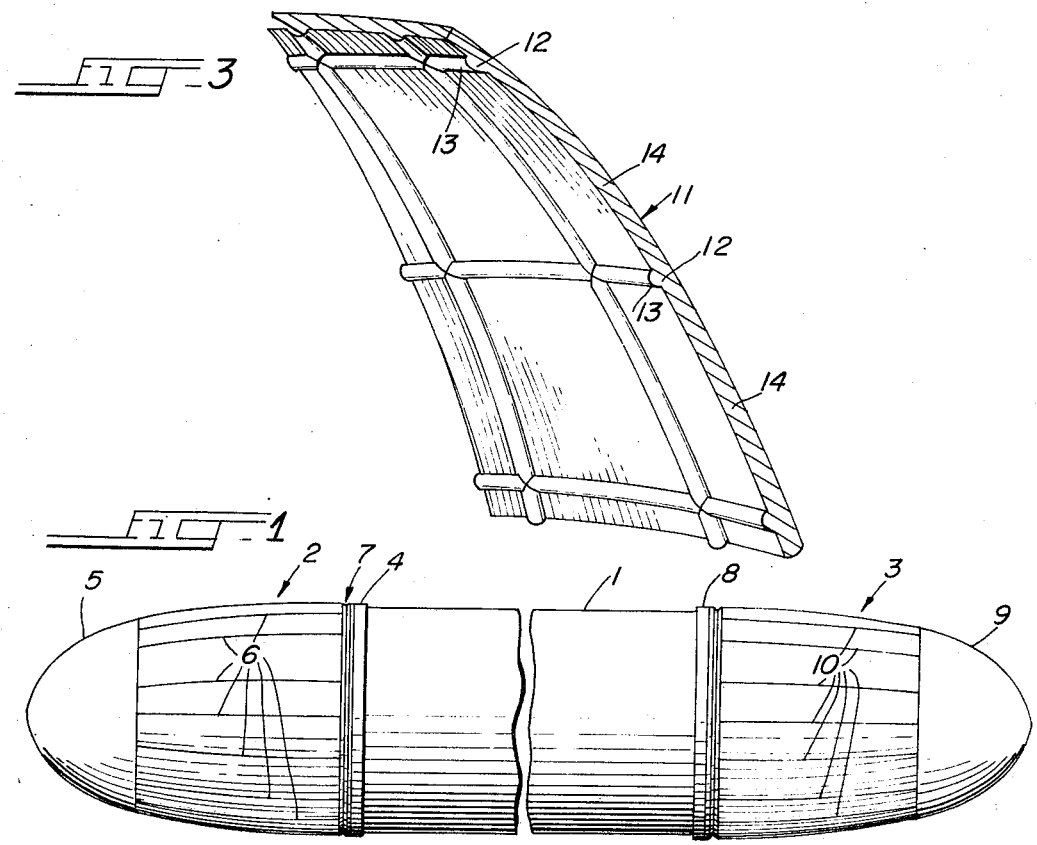
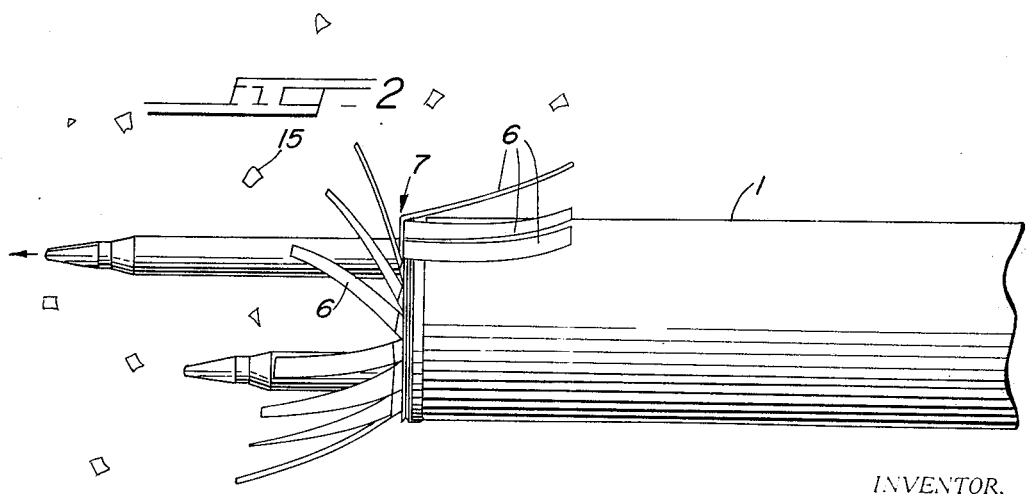
INVENTOR.
PETER L. De LUCA Jan. 9, 1968 P. L. DE LUCA 3,362,291
FAIRING
Filed Sept. 3, 1965 3 Sheets-Sheet 2
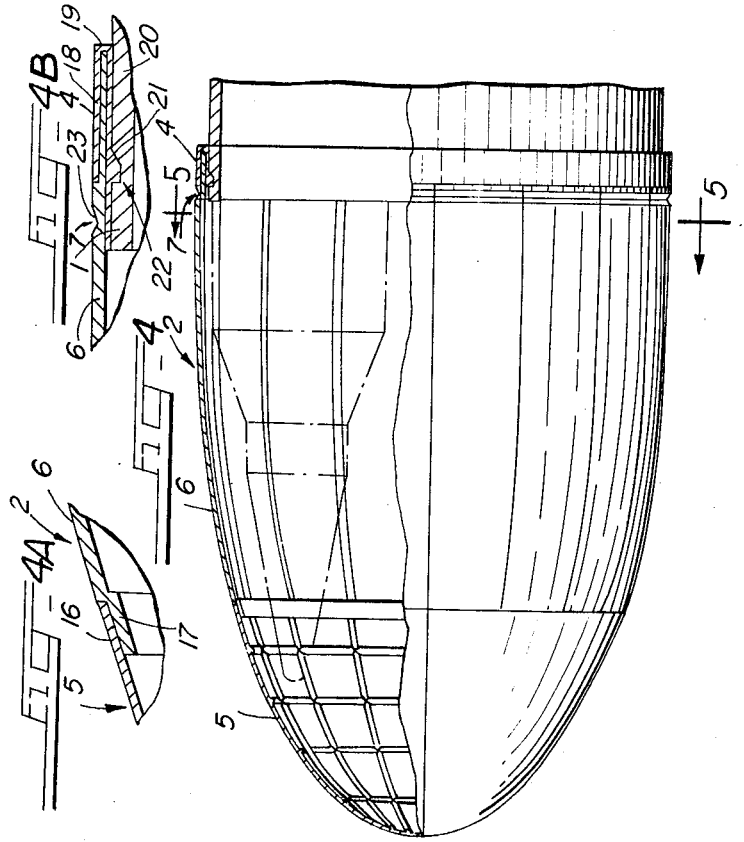
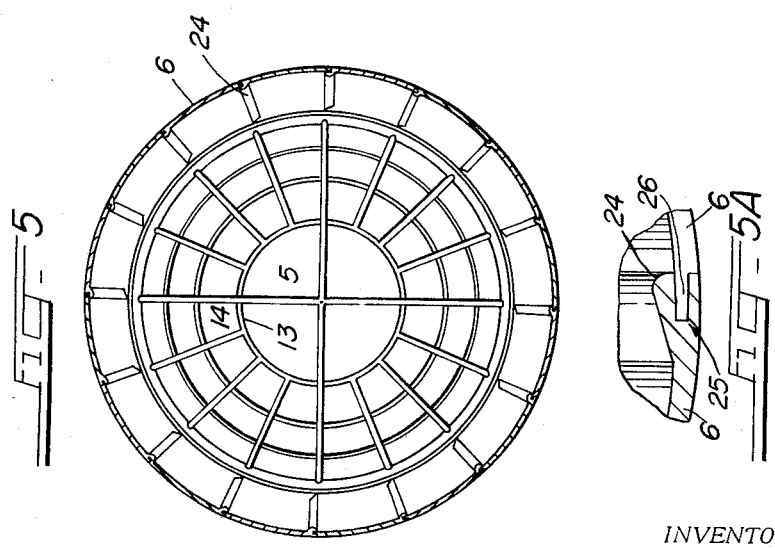
INVENTOR.
PETER L. De LUCA
BY
Marzall, Johnston, Cook & Root
Attys.

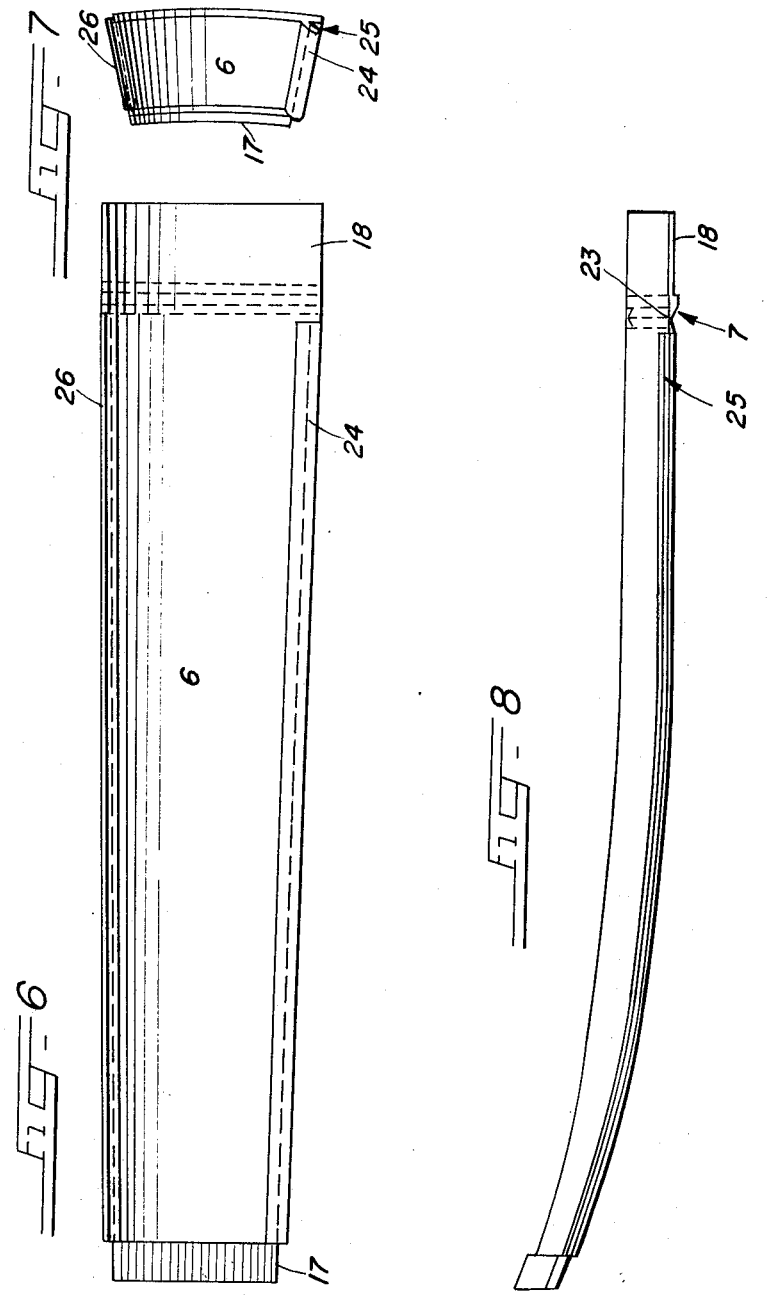

United States Patent Office 3,362,291
Patented Jan. 9, 1968

3,362,291
FAIRING
Peter L. DeLuca, Elgin, Ill., assignor to Hawley Products
Company, St. Charles, Ill., a corporation of Delaware
Filed Sept. 3, 1965, Ser. No. 484,820
5 Claims. (Cl. 89—1.817)

ABSTRACT OF THE DISCLOSURE

Fairings for a missile launcher are made with a tubular base portion and a nose cone connected together by a plurality of staves which form the outside of said fairings, are normally in contact with one another laterally but separable when disengaged from said nose cone and are so formed adjacent said tubular base portion that when a missile is fired from said launcher causing said nose cone to be disengaged, said staves will stream rearwardly in the direction of air flow.

---

This invention relates to fairings, more particularly to nose and tail fairings adapted for use on rocket launchers.

Rocket missiles adapted to be carried by and launched from an aircraft are usually housed in a pad or carrier fixed beneath the wing or fuselage of the aircraft. The portion of the pad in which the missiles are carried, and from which they are launched, resembles a honeycomb with a rocket missile in each cell, and the pad also comprises a nose cone in front of the rocket compartment and a tail cone behind it, as a result of which the rocket compartment is streamlined prior to discharge of the missiles. The nose cone and tail cone are usually called fairings. These fairings should be structurally strong and have a smooth exterior surface so that air will flow around the housing. This is particularly necessary with modern supersonic jet aircraft.

When the rockets are fired from within the launcher housing, the fairings are broken, the nose fairing by the passage of the rocket and the tail fairing by the blast or exhaust gases from the rocket. Considerable difficulty has been encountered with the fragments, resulting from the break-up of the fairings, damaging various portions of the aircraft. Large fragments that have broken away from the nose fairing cause skin damage to the undersides of the wings; similarly, fragments from the tail fairing damage the horizontal stabilizers of the aircraft.

In order to overcome the damage caused by break-up of the fairings it has heretofore been proposed, as in United States Patent 3,140,638, to construct the nose and tail fairings in such a way that they will break up into relatively small fragments that will not damage the aircraft.

One of the objects of the present invention is to provide a new and improved type of construction where damage to the aircraft is avoided with a minimum amount of fragmentation of the fairings.

Other objects and advantages of the invention will be apparent from the following description in conjunction with the accompanying drawings in which:

FIGURE 1 illustrates a preferred embodiment of a missile launcher having nose and tail fairings provided in accordance with the invention;

FIGURE 2 illustrates the manner in which the nose fairing is broken when a missile is fired from the missile launcher;

FIGURE 3 is an enlarged cross section of a portion of the end of a nose fairing or a tail fairing provided in accordance with the invention;

FIGURE 4 is a view, partly in cross section, of a nose fairing provided in accordance with the invention;

FIGURES 4A and 4B are enlarged detail cross sectional views of portions of the structure shown in FIGURE 4;

FIGURE 5 is a view taken along the line 5, 5 of FIGURE 4;

FIGURE 5A is an enlarged cross sectional detail view of the structure shown in FIGURE 5;

FIGURE 6 is a view of one of the staves which forms a part of the fairing;

FIGURE 7 is an end view of the stave shown in FIGURE 6; and

FIGURE 8 is a side view of the stave shown in FIGURE 6.

Briefly described, the fairing of the present invention comprises a tubular base portion adapted to be connected to an end of a tubular missile launcher having an elongated central compartment containing a plurality of lengthwise extending launching tubes, a nose cone, and a plurality of staves connected at one end to said nose cone and at the opposite end to said tubular base portion.

The staves and the nose cone are connected to one another in such a way that when a missile pierces the nose cone, thereby causing it to be removed, the staves will separate from each other and, due to the air pressure caused by the flight of the aircraft to which the missile launcher is attached, the normally forward ends of the staves will be carried rearwardly and will lie along the housing of the missile launcher without being disconnected therefrom. In the case of a tail fairing, the staves will merely flow freely toward the rear as streamers. In either case, the stave portions of the fairings will not cause damage to the aircraft.

To facilitate the rearward movement of the staves of the nose fairing, it is preferable to construct the staves adjacent the tubular base portion with a hinge type of construction. This can be accomplished by providing a transversely extending constricted area adjacent the tubular base portion around which each stave will bend in the direction of the exterior surface of the base portion so that the constricted area acts as a hinge when the staves are disconnected from one another after the nose of the fairing has been removed by the launching of the missile. The provision of the hinge structure is particularly important in a nose fairing. No hinge structure is required in a tail fairing because the staves when released from one another upon the breaking of the tail cone merely form streamers which flow rearwardly along the lines of the air flow created by the aircraft.

In a structure of the type described the staves are preferably connected to each other laterally by a tongue and groove construction.

The outer end of each fairing, which is referred to herein as a nose cone, is preferably constructed of a molded fiber material and can be impregnated with a resin. This portion of the fairing should be frangible and a suitable structure for this purpose is described in U.S. Patent 3,140,638. In this structure the nose cone comprises a one-piece, molded, hollow, substantially cone-shaped shell of fibers impregnated with a brittle resin (e.g., a thermosetting phenol-formaldehyde resin), a smooth outer surface on said shell having aerodynamic characteristics enabling it to withstand air pressures to which it is subjected when mounted on a flying aircraft, said shell having thin wall segments alternating both longitudinally and circumferentially with thicker wall segments, said thicker wall segments forming raised portions on the inner portion of said shell, said thicker wall segments having a lower fiber density throughout than the fiber density of said thinner wall segments and being impregnated with said brittle resin at a relative proportion of said resin to said fiber sufficiently greater than the resin to fiber ratio in said thin wall segments to cause said thicker wall segments to be the more brittle segments and to increase the tendency to shear at said thicker portions when said shell is broken by a rocket fired therefrom.

Since in the fairing of the present invention the nose cone portion of the fairing is smaller than the staved portion, there is less likelihood that the break-up of the nose cone portion will damage the aircraft. It is therefore possible to use other types of nose cone portions, provided the fragments formed are not too large.

Referring to the drawings, FIGURE 1 illustrates a rocket launcher having a housing 1 for an elongated central compartment containing a plurality of lengthwise extending launching tubes, not shown, a nose fairing generally indicated at 2 and a tail fairing generally indicated at 3. The nose fairing 2 comprises a tubular base portion 4, a nose cone 5 and a plurality of lengthwise extending staves 6 which are connected at one end to the nose cone 5 and at the other end to the tubular base portion 4. A hinge area is provided at 7.

Similarly, the tail fairing 3 has a tubular base portion 8, a nose cone 9 and a plurality of staves 10 connected at one end to the base portion 8 and at the opposite end to the nose cone 9. The staves are preferably connected to each other laterally in a manner hereinafter described.

The nose cones 5 and 9 preferably consist of a one-piece, molded, hollow, substantially cone-shaped, shell of fibers having a structure shown in FIGURE 3 with a smooth outer surface 11 and thick wall segments 12 forming raised portions 13 on the inner surface of said shell, alternately with thinner wall segments 14, the fiber density in the thicker wall segments 12 being lower than that in the thinner wall segments 14 and the shell being impregnated with a brittle resin so that the concentration of the resin is greater in the thicker portions 12. Hence, the shell will tend to fragmentize or shear at the thicker portions 12 where there is a greater concentration of brittle resin and when a missile is fired from the missile launcher fragments 15 of the shell will be formed as shown in FIGURE 2. Simultaneously, the staves 6 in the nose fairing 2 will move backwardly around the hinged area 7 and lie along the housing 1.

The gases caused by the firing of the missile will also produce fragmentation of the end 9 of the tail fairing 3, thereby releasing the staves 10 and permitting them to flow rearwardly like streams without damaging the body of the aircraft.

As shown in FIGURES 4, 4A and 4B, each stave 6 is connected to the nose cone 5 by providing an undercut portion at one end thereof which is adapted to form a recess into which the inner ends 16 of the nose cone 5 will fit in overlapping relationship with the end portion 17 of the stave 6. The end portion 16 of the nose cone 5 and the end portion 17 of the stave 6 can be secured together in any suitable manner, for example, by means of an adhesive. Epoxy resins are suitable for this purpose but other types of adhesives can be employed.

At the rear end of the nose fairing 2, the end portion 18 is undercut or recessed on its outer surface to receive the base portion 4 which is an annular ring-shaped member extending inwardly at 19 and then forwardly at 20 with a locking projection 21 adapted to sit in a groove 22 in the housing 1 of one end of the rocket launcher, thereby providing a bayonet-type connection between the tubular base portion 4 of the fairing and the housing 1 of the rocket launcher. As previously indicated, the area 7 has a constricted portion 23 which acts like a hinge for the stave 6 when the stave 6 is released from the nose cone 5 and from its association with adjoining staves.

As shown in FIGURES 5 and 5A, the staves 6 are connected to each other laterally by a tongue and groove type of connection. Each of the staves 6 has an inwardly and longitudinally extending thicker portion 24 provided with a groove generally indicated at 25. On the opposite side each stave has a tongue portion 26 adapted to fit in the groove 25. The staves 6 are all connected together laterally by this tongue and groove arrangement. In a similar manner the staves 10 are connected together in the tail fairing 3. The nose cone 5 holds the staves 6 together at one end and the tubular base member 4 holds them together at the opposite end. In the tail fairing 3, the nose cone 9 holds the staves 10 together at one end and the base member 8 holds them together at the opposite end.

As shown in FIGURES 6, 7 and 8, each stave is curved longitudinally and laterally and tapers from the inner end 18 to the outer end 17. In accordance with the particular requirements of the fairing structure, each stave has a tongue 26 and a groove 25. Each stave is also provided with a hinge 7 which consists of a constricted area 23 that facilitates the rearward movement of the staves along the housing 1 when the staves are released from each other and from the nose cone. The outer surface of each fairing is smooth in order to meet aerodynamic requirements.

The staves 6 and 9 can be made from any suitable material but are preferably made from a synthetic resin, such as, for example, high impact polyethylene which can be extruded, cast, or otherwise formed to provide a rigid structure when the staves are assembled into the fairing but at the same time is sufficiently flexible to reverse direction and flow rearwardly along the outside of the housing of the missile launcher after the staves have been released from the nose cone. Other synthetic resins such as, for example, polypropylene polymers having suitable physical properties can be used to make the staves.

The tubular base portions 4 and 8 of the nose fairing and tail fairing, respectively, are preferably made of metal, such as steel, which can be formed into an annular ring. These base members are capable of some flexibility to permit attachment to the housing of the rocket launcher and release therefrom but afford a relatively rigid structure after the fairing has been connected to the rocket launcher.

In practice, therefore, firing the rockets from the multi-rocket launcher housing results in immediate decapitation of area 5 of nose fairing 2. The staves 6, however, are not destroyed but separate from each other due to the force created by the missile and are blown rearwardly by the missile forces and the air flow due to the motion of the aircraft. The blast of the missile also causes decapitation of the nose cone 9 of the tail fairing 3, and at the same time causes the staves 10 to separate from each other but the rearward air flow tends to keep the staves 10 more or less collected and prevents them from contacting the body of the aircraft.

It will be recognized that the shape of the nose cones 5 and 9 is subject to variation depending upon aerodynamic and structural considerations. Aerodynamically an ogival shape is to be preferred. Structurally, however, a configuration tending toward the spherical is desirable. An elliptical shape is preferably used because it represents the optimum compromise between aerodynamic and structural considerations. It will be understood that the present invention contemplates any or all of these shapes.

The invention makes it possible to provide new and improved fairings which produce a minimum amount of fragmentation and can be used without causing damage to the aircraft.

The invention is hereby claimed as follows:

1. A fairing for a missile launcher comprising a tubular base portion adapted to be connected to an end of a tubular missile launcher, a removable nose cone, and a plurality of staves connected at one end to said nose cone and at the opposite end to said tubular base portion, said staves forming the outside surface of said fairing between said tubular base portion and said nose cone and engaging one another laterally but separable when disengaged from said nose cone, and hinge means formed adjacent said tubular base portion so that the firing of a missile from said launcher causing said nose cone to be removed from said staves will cause said staves to stream rearwardly in the direction of air flow.

2. A fairing as claimed in claim 1 in which said staves have a transverse groove in their outer surfaces forming said hinge means adjacent said tubular base portion.

3. A fairing as claimed in claim 1 in which said staves are formed from a synthetic resin.

4. A fairing as claimed in claim 1 in which said staves are connected to each other laterally by a tongue and groove construction.

5. A fairing as claimed in claim 1 in which said nose cone has a fibrous frangible structure and said staves are formed from a synthetic resin.

References Cited

UNITED STATES PATENTS

| | | | |
|---|---|---|---|
| 2,792,754 | 5/1957 | Walker | 89—1.817 |
| 2,826,961 | 3/1958 | White | 89—1.817 |
| 3,140,638 | 7/1964 | DeLuca | 89—1.817 |

SAMUEL W. ENGLE, *Primary Examiner.*